United States Patent Office 2,846,664
Patented Aug. 5, 1958

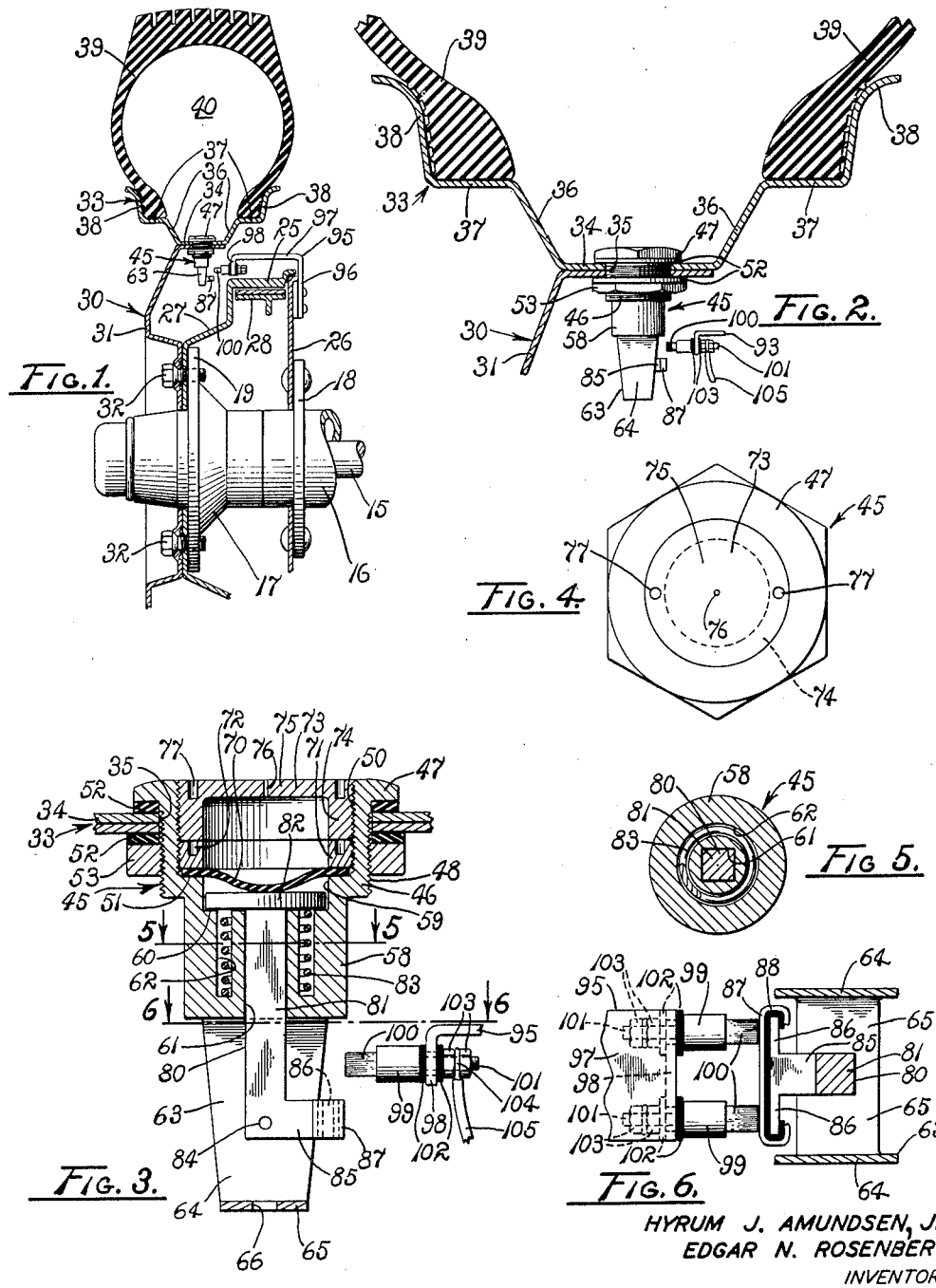

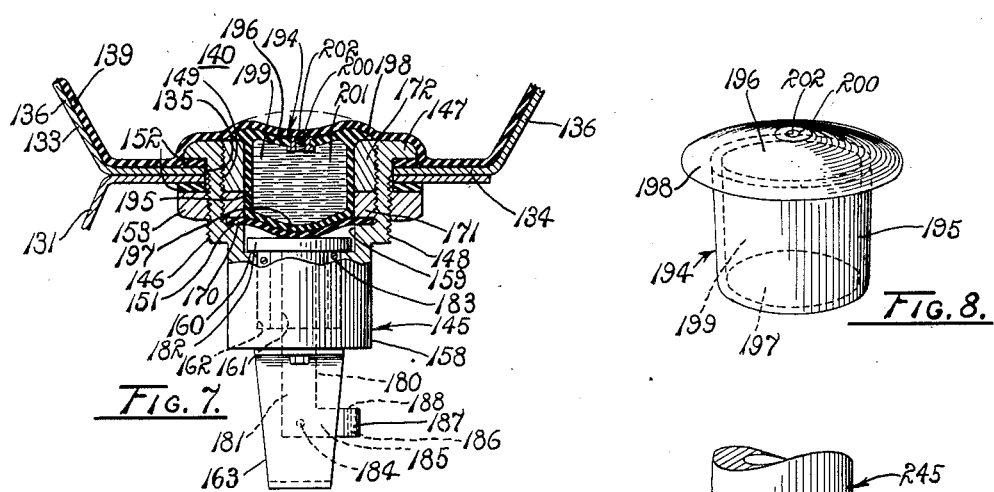
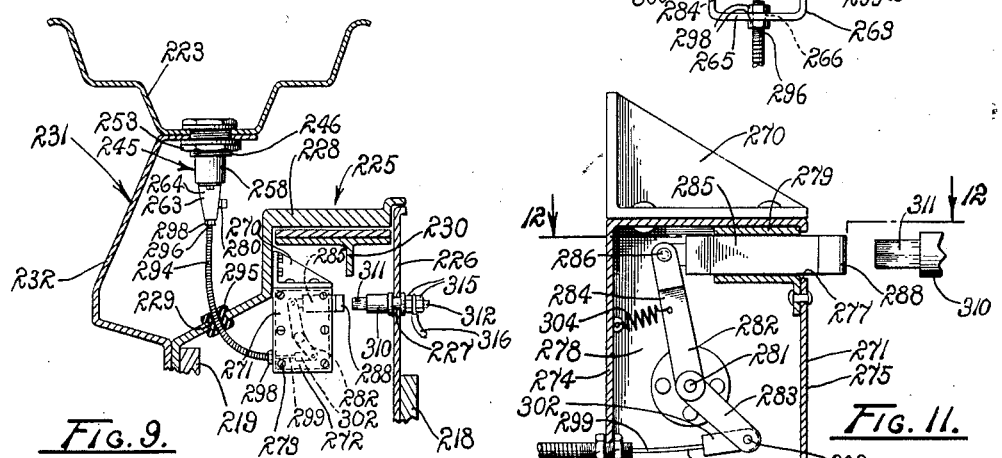
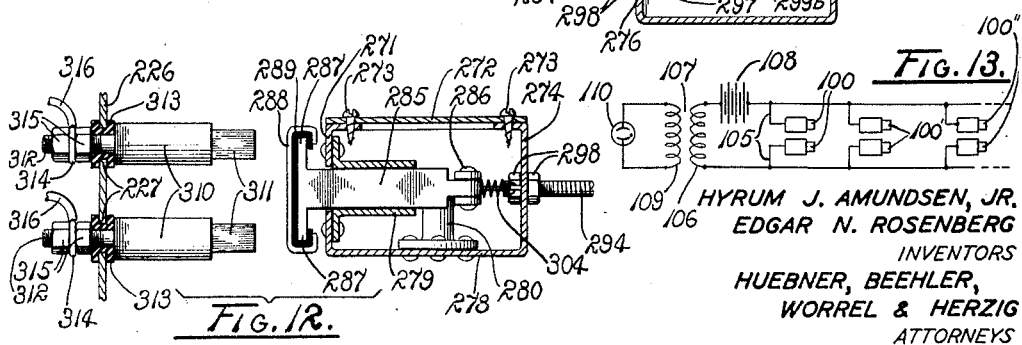

2,846,664

PRESSURE INDICATOR

Hyrum J. Amundsen, Jr., Bakersfield, and Edgar N. Rosenberg, San Diego, Calif.

Application March 28, 1955, Serial No. 497,004

2 Claims. (Cl. 340—58)

The present invention relates to indicators and more particularly, to improvements in an apparatus for indicating pressures within a confining member at a station remotely located from such member. While especially applicable to the registering of tire pressures at positions convenient for visual reference, it will be understood also to be applicable to innumerable other operational environments presenting comparable problems and requirements.

The significance of proper tire inflation to safe and economical operation of automotive vehicles is quite generally recognized and elaborate precautions are frequently taken to insure the maintenance of proper, substantially constant, tire pressures. Of importance in all automotive vehicle operation, accurate inflation control for the tires of large trucks and trailers is vital. The high speed movement of heavy loads imposes such severe wear and strains upon the tires that their maintenance is recognized as a major expense to truck and trailer operation.

Since tire life is largely dependent upon proper tire inflation, it is the usual practice for truckers to make frequent stops for checking purposes. This is a time consuming practice and an onerous interruption of high speed transportation. Inasmuch as service stations are not always available or accessible where checks are to be made, the crude practice of estimating tire pressure by the sound emitted when the tire is struck a sharp blow is often adopted. While this provides a general evaluation of tire inflation it is insufficiently accurate to reveal newly incurred slow leaks of eventual importance. Many times, traffic and road conditions make the parking of the vehicles to check the tires too hazardous to be warranted. In such instances, excessive tire wear frequently ensues. For these and other reasons, the need for accurate checking of tire inflation during travel has long been recognized.

It is also worthy of note that failure to maintain proper tire inflation frequently imposes excessive strains and wear on associated parts of vehicles. For example, in dual tired vehicles, the deflation of one tire imposes substantially all of the load intended for the dual tires on a single tire. Excessive wear and/or rupture of the tire sustaining the excessive load soon follows. Such imbalance of load support is also known to subject axles, axle bearings, differentials, drive shafts and the like to excessive strains.

Many devices have been developed which were intended to alleviate the serious problems noted. Those which have been known to the applicants have, however, been subject to shortcomings which have precluded their general adoption. For example, devices have been known for reporting tire inflation during vehicle operation which have utilized temperature changes to signal tire pressure variations. Generally speaking, these devices have been so delayed in their reporting of pressure changes that their effectiveness has been seriously impaired. There have also been devices intended for the purpose which have relied on pressure actuated plungers movable in response to tire collapse and operable to report the same by means of pre-arranged signal. These devices have generally been incapable of reporting with sufficient accuracy slow pressure variations, have oftentimes reported the development of a hazardous condition after substantial damage has been done, and because of dynamic forces imposed upon the plunger incident to wheel rotation during vehicle movement have been subject to wide ranges of fluctuation in reporting accuracy.

Accordingly, an object of this invention is to provide an improved pressure indicating apparatus.

Another object is to provide a pressure indicating apparatus adapted for use on tube or tubeless type vehicle tires.

Another object is to provide a simplified pressure indicating apparatus for vehicle tires.

Another object is to provide a tire pressure indicating apparatus of the plunger type having improvements in the transmission of tire pressure to the plunger for actuation of the latter.

Another object is to provide a tire pressure indicator for a tubeless tire which precludes an instantaneous pressure drop in the tire incident to failure of the indicating apparatus.

Another object is to provide a tire pressure indicator for tires employing inner tubes in which pressure is transmitted from the tube to a reciprocal plunger by fluid pressure.

Another object is to provide a tire pressure indicator for vehicles which is dependent on periodic engagement of contact elements and which is adapted to enable positioning of the contact elements in a relatively clean and dry location.

Another object is to provide a tire pressure indicator of the plunger type having improvements in the transmission of the plunger movements to energize a signaling device.

Another object is to provide a tire pressure indicator having an improved motion transmitting device between a plunger reciprocally movable in response to tire pressure changes and a signaling device energizing means remotely located from the plunger.

Another object is to provide a tire pressure indicator in which visual signaling is effected by periodic energization of a lamp containing ionizable gas.

Other objects are to provide a tire pressure indicator which is dependable in operation, easy to install, adaptable to many vehicles and tires, economical to construct and to maintain and thoroughly effective for its intended purposes.

These and other objects will become more fully apparent upon reference to the following description.

Referring more particularly to the drawings:

Fig. 1 is a partial vertical section taken through a wheel of a vehicle and associated parts, having a tubeless tire mounted thereon, and showing a pressure indicating apparatus as provided by the present invention mounted thereon.

Fig. 2 is a somewhat enlarged fragmentary portion of Fig. 1 showing in particular, the rim and tire of the wheel together with the pressure indicating apparatus.

Fig. 3 is a somewhat enlarged longitudinal section taken through a portion of the pressure indicating device of the present invention.

Fig. 4 is an end view of the pressure indicating device as seen when looking downwardly on the device as illustrated in Fig. 3.

Fig. 5 is a transverse section of the pressure indicating device taken at the position indicated by line 5—5 of Fig. 3.

Fig. 6 is a transverse section of the indicating device taken at the position indicated by line 6—6 of Fig. 3.

Fig. 7 is a view similar to Fig. 2 but showing a second form of the invention suitable for use with a tire having an inner tube.

Fig. 8 is a somewhat enlarged perspective view of an inflatable fluid containing bag employed with the form of the invention shown in Fig. 7.

Fig. 9 is a fragmentary section through a vehicle wheel showing a tire pressure indicating apparatus having a different form of motion transmitting arrangement from that shown with the forms of the invention of Figs. 1–6 and Figs. 7 and 8 but suited for use with either of such forms.

Fig. 10 is a somewhat enlarged fragmentary view illustrating the manner in which the motion transmitting arrangement of Fig. 9 is connected to a pressure actuated plunger.

Fig. 11 is a somewhat enlarged longitudinal cross section through a linkage assembly casing and associated parts as employed with the form of the invention shown in Fig. 9.

Fig. 12 is a somewhat enlarged section of an electrical contacting mechanism employed with the apparatus of Fig. 9 showing portions thereof in elevation.

Fig. 13 is a schematic diagram of an electrical circuit employed with the present invention for energizing a signaling element.

Referring more particularly to the drawings:

A suitable environment for employing the present invention is partially shown in Fig. 1 including an axle 15 associated with a vehicle such as a truck or the like, not shown. An axle tube 16 is fitted over the axle and a bearing housing, generally indicated at 17, endwardly encloses the axle. In addition, a mounting plate 18 and a mounting flange 19 are provided transversely on the axle tube and bearing housing, respectively.

A brake housing 25 is provided including a brake shield 26 mounted on the mounting plate 18, a brake drum 27 mounted on the mounting flange 19 and rotatable with the axle, and brake shoes 28 mounted within the brake housing for outward radial movement against the drum during brake application.

A wheel, generally indicated at 30, includes a wheel disk or hub 31 removably connected to the mounting flange 19 by bolts 32 and a rim 33 conveniently shown as of drop center type. Thus, the rim includes a base flange 34 providing an opening 35 therein, inner substantially straight flanges 36, outwardly extended ledges 37 and outwardly arcuate ring flanges 38. An air inflated tubeless tire 39 is mounted in the rim and provides annular ribs 40 in frictional engagement with the wing flanges of the rim thereby tightly to seal inflating air in the interior air chamber 40 of the tire.

The foregoing description relates to well-known structures and has been alluded to in order to enable a fuller appreciation of the application and utility of the present invention which is described hereinafter.

An elongated housing 45 is fitted through the opening 35 in the rim 33 and provides a substantially cylindrical cup portion 46 having an annular end flange 47, externally threaded cylindrical surface 48, an internally threaded substantially cylindrical pressure chamber or bore 50 and an annular shoulder 51. Internal and external gaskets 52 are placed respectively between the annular flange 47 and the base flange 34 of the rim and between the base flange and a nut 53 which is screw-threadedly received on the threaded surface 48 and tightened against the external gasket. In this manner, the housing is mounted radially in the rim while maintaining air tight integrity within air chamber 40 of the tire 39.

The housing 45 further includes a substantially cylindrical neck portion 58 extended from the cup portion 46 which is closed at the end, and which provides a cylindrical guide bore 59 centrally located in the housing and diametrically reduced from the pressure chamber 50, an annular ledge 60, a central plunger slideway 61, axially extended from the pressure chamber and non-circular in cross-section and an outer circumscribing, concentric bore 62.

A U-shaped bracket 63 is endwardly extended from the neck portion 58 and provides a pair of spaced side flange plates 64 interconnected at their ends by a mounting plate 65 having an opening 66 therein, as best seen in Fig. 3.

A resilient, flexible diaphragm or membrane 70 of rubber, corrugated metal or the like is supported transversely in the cup portion 46 of the housing 45 on the annular shoulder 51 and is held tightly peripherally against the shoulder by a ring nut 71 screw threadedly received in the pressure chamber 50. The nut provides wrench sockets 72 for insertion and removed thereof. A cup-shaped cover 73 is also screw-threadedly received in the pressure chamber and provides a peripheral substantially cylindrical wall 74 and an end wall 75 having a small air passage 76 therein for permitting restricted air travel to and from the air chamber 40 and the pressure chamber. Again, wrench sockets 77 are provided in the cover for removal and insertion thereof.

A plunger or piston 80 is provided and includes an elongated plunger rod 81 conforming in cross-section to that of the plunger slideway 61 and slidably received in such bore. The plunger also has a plunger head 82 slidably received in the guide bore 59 of the housing and yieldably held in abutment against the diaphragm 70 by a coil spring 83 mounted in the outer annular bore 62. In addition, the plunger has an endwardly located eyelet 84 and a perpendicularly extended, endwardly positioned actuating arm 85. The arm provides a pair of perpendicularly, laterally extended flanges 86 over which is mounted a contact bar 87 electrically inslated from the arm by a strip of insulation 88.

A brace or bracket 95 has a downwardly extended support flange 96 rigidly connected, as by welding, to the brake shield 26, an overhanging arm 97 outwardly extended over the brake drum 27 toward the housing 45 and a downwardly bent mounting flange 98. A pair of brush holders 99 are fitted in the mounting flange 98 and each supports an electrically conductive brush 100 connected to a conducting rod 101 inwardly extended through the mounting flange within an insulating grommet 102 and threaded at its inner end. The brushes may be of the carbon block type or composed of a plurality of wire conducting bristles, as desired. A pair of conductive nuts 103 are threadably received on each rod and constitute clamps for holding a connector lug 104 therebetween. Each of the lugs has a lead wire 105 connected thereto.

The lead wires 105 are connected in series circuit with a low voltage primary coil 106 of a transformer 107 and a battery 108 or other source of voltage, as best shown in Fig. 13. The transformer has a high voltage secondary coil 109 connected in series circuit with a neon tube 110 or other tube containing a suitable ionizable gas. The transformer and battery are mounted in any convenient location in the vehicle, not shown, and the neon tube is mounted in a conveniently visible location preferably adjacent to the driver's seat of the vehicle, not shown, for ready visual reference during driving. Where the inflation of several tires is to be observed, the indicators of the present invention are individually connected to each tire in the manner above described and brushes 100', 100'' or as many as are needed, connected in parallel with the brushes 100 in the primary circuit of the transformer, as will be readily apparent to those skilled in the art.

*Operation*

The operation of the described embodiment of the present invention is believed to be readily apparent and is briefly summarized at this point. Mounted in the manner illustrated in Fig. 1, the tire 39 is inflated to the required pressure. Air in the chamber 40 of the tire passes through the air passage 76 in the cover 73 of the housing 45 into the pressure chamber 50 until the pressures in these chambers are equalized. Thus, the diaphragm 70 is subject to the air pressure in the tire and when the latter is adequately inflated, the diaphragm flexes outwardly of the pressure chamber 50 against the plunger head 82 to urge the plunger 80 endwardly of the housing against the action of the spring 83. In this regard, it is to be noted that the strength of the spring employed is determined by the pressure desired for the tire. More specifically, the higher the tire pressure required, the stronger must be the spring. In any event, when the plunger is fully extended, the contact bar 87 does not contact the brushes 100 during rotation of the wheel 30 and thus the neon bulb 110 remains de-energized.

When the pressure in the tire 39 falls below a predetermined value, the diaphragm 70 is urged inwardly toward, or into, the pressure chamber 50 by the spring 83 bearing against the plunger head 82. A predetermined drop in the air pressure is adapted to move the contact bar 87 into radial alignment with the brushes 100 for engagement thereof during each revolution of the wheel 30. Bridging of the brushes by the contact bar closes the primary circuit of the transformer 107 through the coil 106 and the battery 108. This induces a high voltage in the secondary coil 109 thereby to momentarily and cyclically energize the neon bulb 110. The brushes constitute a switch opened and closed by the contact bars to produce an intermittent flashing of the bulb which serves as a signal or warning to the driver of the vehicle that the tire pressure has dropped below the desired level.

The cover 73 is constructed in the manner described to provide a safety factor of special importance when used with a tubeless tire. Since only restricted air passage is permitted through the small opening 76 in the end wall 75, air cannot rapidly escape from the air chamber 40 of the tire 39 if diaphragm 70 should rupture, for example. Thus, the hazards of possible sudden tire collapse incident to failure of the subject apparatus are obviated.

Another form of the present invention is shown in Figs. 7 and 8 for use with tires having inner tubes.

In Fig. 7, there is shown a disk or hub 131 of a wheel and a rim 133 providing a base flange 134 having an opening 135 and inner substantially straight flange 136. An air inflatable inner tube 139 is shown in inflated condition mounted on the rim.

A housing 145 is employed which is substantially identical in construction to housing 45 described in connection with the form of the invention shown in Figs. 1–6. The housing includes, therefore, a cup portion 146 having an annular end flange 147, an externally threaded cylindrical portion 148, an internally threaded substantially cylindrical pressure chamber 149, and an annular shoulder 151. The housing is mounted in rim 133 by placing internal and external gaskets 152 intermediate the base flange 134 and the annular flange and intermediate the annular flange and a nut 153 tightened down on the cup against the external gasket.

A neck portion 158 is extended from the cup portion 146 and provides a central guide bore 159, an annular ledge 160, a central non-circular plunger bore 161, and an annular circumscribing concentric bore 162. A bracket 163, similar to bracket 63, is endwardly extended from the neck portion.

A diaphragm 170 is positioned transversely in the chamber 149 on shoulder 151 and a ring nut 171 is screw-threadably peripherally tightened down thereagainst. An annular collar 172 is screw-threadably fitted in the pressure chamber endwardly abutting the ring nut and having an internal diameter substantially equal to the internal diameter of the nut.

A plunger 180 is also employed with this form of the invention and includes a plunger rod 181 slidably mounted in the plunger bore 161, a plunger head 182 slidably mounted in the guide bore 159 and yieldably urged against the diaphragm 170 by a coil spring 183 mounted in the annular bore 162, an eyelet 184 and a perpendicularly extended, endwardly positioned arm 185. The arm provides perpendicularly laterally extended flanges, not shown, mounting thereon a contact bar 187 separated from the flanges by a strip of insulation, likewise not shown.

A hollow flexible bag 194 of a suitable plastic or rubber material is employed with this form of the invention and includes a substantially cylindrical peripheral wall 195, inner and outer end walls 196 and 197 and an annular mounting flange 198. The walls define an internal chamber 199 within the bag adapted to be filled through an inlet orifice 200 in the inner end wall 196 with a non-compressible fluid, generally indicated at 201. A plug 202 is provided for releasable threaded insertion in the orifice. In use, the bag is fitted in the pressure chamber 149 of the housing 145 within the ring nut 171 and the annular collar 172 and with the mounting flange 198 endwardly positioned against the annular collar. In this position, the outer end wall 197 of the bag is in flush engagement with the diaphragm 170.

A circuit identical to that shown in Fig. 13 is employed with the second form of the invention and thus the description thereof is not repeated at this point.

The operation of the second form of the invention is believed readily apparent and is now briefly summarized. When the inner tube 139 is inflated to its full size with the desired air pressure, a portion 210 thereof flexes outwardly against the inner end wall 196 of the bag 194 thereby forcing the outer end wall 197 and the diaphragm 170 outwardly of pressure chamber 149. It is believed readily understood that the non-compressible fluid 201 in the bag serves to transmit flexing movements of either end wall to the opposite end wall of the bag and thus flexing movements of the inner tube are transmitted to the diaphragm through the bag. Therefore, when the inner tube is at the proper pressure, the diaphragm is urged outwardly against the plunger head 182 in opposition to the spring 183 and thus, the contact bar 187 is held away from the brushes, not shown, during rotation of the wheel.

When pressure drops in the inner tube 139 below a predetermined level, the spring 183 urges the diaphragm 170 and the outer end wall 197 inwardly of the pressure chamber 149 thereby urging the inner end wall 196 and the portion 210 of the inner tube into a position indicated by dashed lines in Fig. 7. Thus, the contact bar 187 is brought into annular or radial alignment with brushes, not shown, and during each revolution of the wheel, the contact bar bridges or connects the brushes and energization of an ionizable gas tube is effected in the same manner as above described in connection with the form of the invention shown in Figs. 1 to 6.

A further form of the present invention is shown in Figs. 9 to 12 and relates particularly to an arrangement for transmitting motion from a plunger, such as 80 and 180 in Figs. 1–6 and Figs. 7–8, respectively, to a contact bar, such as 87 and 187 in Figs. 1–6 and Figs. 7–8, respectively.

Referring to Fig. 9, however, there is seen a mounting plate 218 adapted for attachment to a vehicle axle housing and a mounting flange 219 adapted for connection to an axle, such as those previously shown. A brake housing 225 is provided including a brake shield 226 connected to the mounting plate having a hole 227 therein, a brake drum 228 connected to the mounting flange having a hole 229 therein, and brake shoes 230 within the housing for engagement with the drum upon application of the brakes.

A wheel 231 is provided having a hub 232 connected to the mounting flange 219 and a rim 233. A tire pressure indicator is employed including a housing 245 constructed in the manner above described either in the form of the invention of Figs. 1 to 6 for tubeless tires or in the form of Figs. 7 and 8 for tires requiring tubes. In any event, the housing defines a cup portion 246, an endwardly extended neck 258 and is mounted in the rim by a nut 253. A plunger 280 is slidably mounted in the housing for reciprocal movement between an inwardly retracted position and an outwardly extended position and has an eyelet 284 therein.

A substantially U-shaped bracket 263 is endwardly extended from the neck portion of the housing and provides a pair of lateral flange plates 264 endwardly interconnected by a mounting plate 265, the latter having an opening 266 therein.

Thus far, this form of the invention is identical to that above described in Figs. 1–6 and Figs. 7–8. However, in some instances it is desirable to protect the electrical contacting portions of the indicating device from rain, snow, ice, dirt, mud or the like. Therefore, this form of the invention provides an angulated bracket 270 mounted on the brake drum 227 and located within the brake housing 225. A box or casing 271 is supported on the bracket and provides a removable cover plate 272 held in position by bolts 273. The casing also has a pair of longitudinal side walls 274 and 275 having, respectively, a lower opening 276, an upper opening 277 and a front wall 278 in opposed parallel relation to the cover plate. A rectangular guide sleeve 279 is mounted interiorly of the casing in axial alignment with the upper opening 277.

As best seen in Fig. 12, a linkage assembly is provided including a journal bearing 280 mounted on the front wall 278 within the casing 271 for rotatably supporting a pivot pin 281 transversely of the casing. A bell crank 282 is journalled on the pivot pin and provides an actuated link 283 and a controlled link 284 in oppositely outwardly extended obtuse angular relation from the pivot pin. A substantially rectangular actuating arm or rod 285 is mounted for slidable non-rotatable movement within the guide sleeve 279 and provides an inner end 286 pivoted to the controlled link. The actuating arm has a pair of perpendicularly laterally extended flanges 287 mounting a contact bar 288 thereon separated from the flanges by a strip of insulation 289, in much the same manner as that above described in connection with the actuating arms 85 and 185. The bell crank is adapted to slidably reciprocate the actuating arm inwardly and outwardly of the casing, being normally urged into inward position by a spring 290 connected between the side wall 274 and the controlled link.

An elongated flexible sheath 294 is extended through a grommet 295 in hole 229 in the brake drum 228 and has opposite threaded ends 296 and 297 respectively connected by nuts 298 to the mounting plate 265 of the bracket 263 and to the longitudinal side wall 274 of the casing 271. An elongated flexible control line or cable 299 is slidably extended through the flexible sheath and has one end 299a connected to a U-shaped connector element 300. The connector element is connected, in turn, to the plunger rod 280 by a bolt 301 extended through the eyelet 284. The control line provides an opposite end 299b extended into the casing and a lug 302 connected thereto is pivotally connected at 303 to the actuated link 283. Thus, slidable movements of the plunger are transmitted to the actuating arm to slide it inwardly and outwardly of the box through the flexible line and bell crank 282. A spring 304 is connected between the side wall 274 and the controlled link 284 for urging the actuating arm into its inner position.

A pair of brush holders 310 are mounted in the brake shield 226 and individually mount brushes 311 having connector rods 312 extended from the brushes through the holders to positions externally of the brake housing 225. Insulating grommets 313 are provided between the brake shield and the rods and connector lugs 314 are releasably attached to the rods by nuts 315. As before, electrical lead lines 316 extend from the lugs for connection in a primary circuit of a transformer. Again, the electrical circuit utilized is that of Fig. 13.

In operation, when the pressure in the tire, not shown, is at the desired level, the actuating arm 285 is in retracted position out of engagement from the brushes 311 during each reduction of the wheel 231. However, as soon as the pressure drops below a predetermined amount, the plunger 280 moves inwardly of the housing 245 thereby pulling the flexible line 299 through the sheath 295. This pivots the bell crank 282 on the pin 281 to push the actuating arm outwardly of the casing 271 whereby the contact bar 288 is brought into engagement with the brushes 311 during each revolution of the wheel 230. Energization of a neon bulb is thereupon effected in the same manner as above described.

This latter form of the invention enables the positioning of the contact bar 288 and brushes 311 within the brake housing 225 thereby protecting them against inclement weather conditions, dirt, tampering, accidental damage and the like. Utilization of the flexible control line 299 mounted in a flexible sheath 295 enables positioning of the linkage assembly, contact bar and brushes not only in the brake housing but in any convenient location remote from the wheel 231.

Although the principles of this invention have been illustrated in three forms, it is to be recognized that the embodiments are not entirely independent of each other. For example, the tubeless tire indicator of Figs. 1–6 is readily adapted for use on inner tube tires merely by replacing the cover 75 by the collar 172 and bag 194. Conversely, the indicator of Figs. 7 and 8 may be used with tubeless tires simply by employing a cover 75 instead of the collar 172 and bag 194. In addition, the flexible cable transmission system of Figs. 9–12 may be used with either form of the invention shown in Figs. 1–6 or Figs. 7–8.

As explained before, the electrical circuit of Fig. 13 is employable with all forms of the invention. In this regard, several significant observations are to be made. It has been found by considerable experimentation that a neon tube, or similar tube using an ionizable gas, is vastly superior to other signaling means in assuring successful and dependable operation of the device. This is true since the instantaneous contact between the brushes at high vehicle speeds does not permit prolonged electrical energization of the signaling element, therefore, ordinary filament type lamps have been found virtually useless for the purpose.

Other designs for the structure of the present invention will be readily apparent to those skilled in the art. As an example, the housings 45, 145 or 245 could be angulated in form so as to extend pependicularly to the radial dimension of the wheel thereby avoiding the effects of centrifugal force on the plungers. The bag 194 could be shaped in any form to accommodate such angularity.

Although the invention herein has been shown and described in what is conceived to be the most practical and preferred embodiments, it is recognized that departures may be made therefrom within the scope of the invention, which is not to be limited to the details disclosed herein, but is to be accorded the full scope of the claims so as to embrace any and all equivalent devices and apparatus.

Having described our invention, what we claim as new and desire to secure by Letters Patent is:

1. In a vehicle including a wheel rotatably mounted on the vehicle in supporting relation thereto adapted to rotate at various angular velocities corresponding to various linear velocities of the vehicle during earth traversing movement, a pneumatic tire mounted on the wheel, a pair of spaced electrical switch contacts mounted on the vehicle adjacent to the wheel and subject to inadvertent electrical bridging by rain water, snow, ice, and the like, and a pressure responsive device mounted on the wheel for rotation therewith having pneumatic connection to the tire and including an electrically conductive plunger movable between a position periodically bridging the switch contacts during each revolution of the wheel when the pressure in the tire is below a predetermined minimum and a retracted position spaced from the contacts during revolutions of the wheel when the pressure in the tire is above said minimum; an electrical system for indicating reduction in pressure in the tire below said predetermined minimum adapted to avoid erroneous indication incident to inadvertent bridging of the contacts comprising an ionizable gas discharge tube having a predetermined ionizing potential and adapted to produce a visible glow upon application of a pulse of voltage corresponding to said ionizing potential; a source of low voltage of inadequate potential to span the contacts in the presence of rain water, ice, and the like; and a voltage step-up transformer including a low voltage primary coil connected in series circuit with the contacts and the low voltage source, and a high voltage secondary coil connected in series circuit with the gas tube, the low voltage source being applied in pulses across the low voltage primary coil of the transformer incident to wheel rotation when the plunger is in said bridging position to induce comparatively high voltage pulse current in the secondary coil of ionizing potential for the gas tube to energize the tube.

2. In a vehicle including a wheel rotatably mounted on the vehicle in supporting relation thereto adapted to rotate at various angular velocities corresponding to various linear velocities of the vehicle during earth traversing movement, a pneumatic tire mounted on the wheel, a pair of spaced electrical switch contacts mounted on the vehicle adjacent to the wheel and subject to inadvertent electrical bridging by rain water, snow, ice, and the like, and a pressure responsive device mounted on the wheel for rotation therewith having pneumatic connection to the tire and including an electrically conductive plunger movable between a position periodically bridging the switch contacts during each revolution of the wheel when the pressure in the tire is below a predetermined minimum and a retracted position spaced from the contacts during revolutions of the wheel when the pressure in the tire is above said minimum; an electrical system for indicating reduction in pressure in the tire below said predetermined minimum adapted to avoid erroneous indication incident to inadvertent bridging of the contacts comprising an ionizable gas discharge tube having a predetermined ionizing potential and adapted to produce a visible glow upon application of a pulse of voltage corresponding to said ionizing potential; a source of low voltage of inadequate potential to span the contacts in the presence of rain water, ice, and the like; a voltage step-up transformer including a low voltage primary coil connected in series circuit with the contacts and the low voltage source, and a high voltage secondary coil connected in series circuit with the gas tube; and means mounting the tube, the entire transformer and the low voltage source on the vehicle in a stationary position remote from the wheel and shielded from rain water, ice, and the like, the low voltage source being applied in pulses across the low voltage primary coil of the transformer incident to wheel rotation when the plunger is in said bridging position to induce comparatively high voltage pulse current in the secondary coil of ionizing potential for the gas tube to energize the tube.

References Cited in the file of this patent

UNITED STATES PATENTS

| | | |
|---|---|---|
| 2,199,032 | Stoddard | Apr. 30, 1940 |
| 2,347,541 | Critser et al. | Apr. 25, 1944 |
| 2,417,940 | Lehman | Mar. 25, 1947 |
| 2,439,561 | Cressey | Apr. 13, 1948 |
| 2,482,984 | Lans et al. | Sept. 27, 1949 |
| 2,710,391 | Trinca | June 7, 1955 |